June 10, 1924.
G. PAGELLA
ARMORED PNEUMATIC TIRE
Filed Jan. 8, 1924
1,497,155
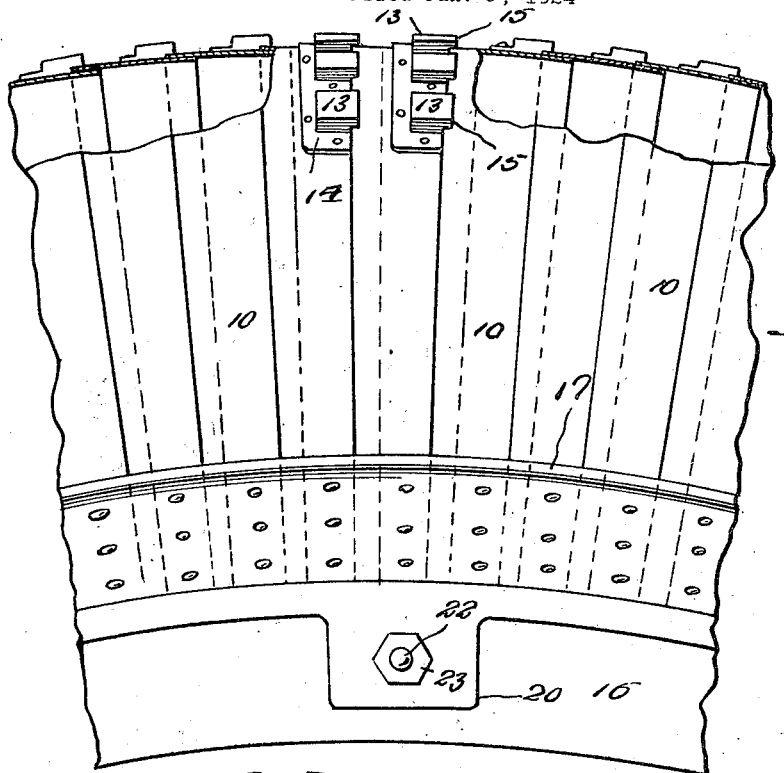
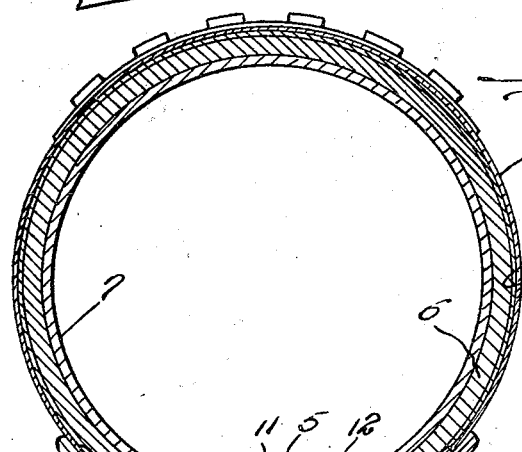
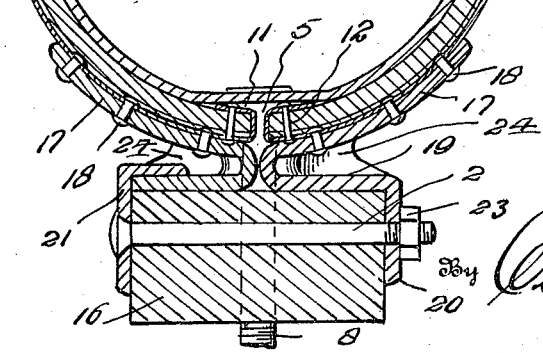
Inventor
Gennaro Pagella,
By Clarence A. O'Brien
Attorney Patented June 10, 1924.

1,497,155

UNITED STATES PATENT OFFICE.

GENNARO PAGELLA, OF ST. LOUIS, MISSOURI.

ARMORED PNEUMATIC TIRE.

Application filed January 8, 1924. Serial No. 685,053.

*To all whom it may concern:*

Be it known that I, GENNARO PAGELLA, a subject of the King of Italy, residing at St. Louis, in the county of St. Louis and State of Missouri, have invented certain new and useful Improvements in Armored Pneumatic Tires, of which the following is a specification.

This invention relates to certain new and useful improvements in pneumatic tires for vehicle wheels and has particular reference to an improved form of resilient tire shoe and fastening means therefor.

The primary object of the invention is to provide a pneumatic tire shoe that will be extremely durable, substantially punctureproof and effective in preventing skidding.

A further object is to provide a pneumatic tire shoe which will possess a high degree of resiliency and may be manufactured at a comparatively low cost, as well as readily and easily applied to or removed from the felly of a vehicle wheel.

A further object of the invention is to provide a pneumatic tire shoe characterized by the provision of an external armor composed of transverse overlapping resilient strips, and wherein simple and effective means is provided upon each of the strips for cooperation with the next adjacent strip at one side thereof so as to effectively maintain the said strips in their proper radial positions and against displacement circumferentially of the tire relative to each other, such means at the same time serving to provide means for effectively preventing skidding.

Still another object of the invention is to provide a tire shoe of the above kind, wherein the same is circumferentially split at its inner side and is provided along its edges with rigidly and permanently attached rings forming part of simple and durable means for effectively securing the tire upon the felly of a vehicle wheel.

With the above general objects in view and others that will become apparent as the nature of the invention is better understood, the same consists in the novel form, combination, and arrangement of parts hereinafter more fully described, shown in the accompanying drawing and claimed.

In the drawing, wherein like reference characters indicate corresponding parts throughout the several views:

Figure 1 is a fragmentary side elevational view, partly broken away and in section of a tire shoe constructed in accordance with the present invention, and operatively applied upon the felly of a vehicle wheel.

Figure 2 is a transverse sectional view of the device shown in Figure 1, and

Figure 3 is a plan view of one of the lug carrying strips.

The present invention embodies a tire shoe that is circumferentially split, as at 5, at its inner side as indicated in Figure 2, and that is also preferably of circular form in cross section, as is also shown in this view. The tire shoe embodies an inner lamination 6, preferably formed from canvas so as to be relatively thick for resisting bursting of the usual inner tube 7 that is employed within the shoe and that is inflated under pressure in the usual manner, the air being introduced through the usual valve stem 8. The tire shoe further preferably includes an outer lamination of soft rubber as indicated at 9 for protecting the canvas lamination 6 from the abrading effect of the external metallic armor to be hereinafter described.

The tire shoe further embodies an external metallic armor that completely covers the outer lamination 9, and that is composed of a series of transverse circular metallic strips 10 that are disposed with their adjacent edges in overlapping relation as indicated in Figure 1, the ends of the strips 10 being folded inwardly above the edges of the laminations 6 and 9 as indicated at 11 and riveted to the latter as at 12 so that the transverse strips 10 will be held at their ends in proper relation to each other and to the laminations 6 and 9, at the same time forming a binding or reinforcement for the edges of said laminations. Each strip 10 has a transversely disposed series of outwardly projecting lugs 13 rigid with the tread portions or central portion thereof, and these lugs are preferably fixed to transverse plates 14, that are riveted or otherwise secured to the strips 10. The lug plates 13 are provided at one end with overhanging lips as at 15 adapted to overlap the next adjacent strip 10 that is overlapped onto the particular strip 10 to which the lug plates 14 are fixed, and by reason of this construction effective means is provided at the tread portions of the strips 10 for preventing their relative circumferential displacement which tends to take place when a vehicle equipped with tires constructed in accordance with the above is started or stopped. In other words, certain of the lugs 13 will at all times be engaged with the road and upon sudden turning of the wheel or stoppage of turning thereof, the tendency is to displace the lugs 13 circumferentially of the tire. As these lugs are rigid with the transverse strips 10, and as they are overlapped in serial relation with the succeeding strips, this strain is transmitted from one strip to the other entirely around the tire, and displacement of the strips 10 in a circumferential direction is thereby effectively prevented. In this manner destruction of the strips 10 is rendered highly unlikely, and detachment of the same from attaching rings, to be hereinafter made apparent is also rendered unlikely.

It is apparent that the lug plates 13 will additionally effectively serve as means for preventing longitudinal or sidewise skidding of vehicles equipped with wheels constructed in accordance with the above, and by reason of the fact that the strips 10 are made of resilient sheets of sheet metal the resultant tire will be highly resilient for effectively absorbing shocks and jars and at the same time will not only serve to prevent pointed objects from penetrating the inner tube 7, but will also assist the laminations 6 and 9 in resisting bursting strains due to the air pressure within the inner tube.

The invention embodies means for effectively mounting the tire shoe upon the usual felly 16 of a vehicle wheel, which means embodies a pair of metallic rings, each including outer circular members 17 of arcuate cross section that are rigidly attached to the inner ends of the strips 10 by riveting or the like as at 18. Each fastening ring further embodies an inner cylindrical member 19 that is rigid with and projects from the inner edge of its respective members 17 and is adapted to be disposed upon the periphery of the felly as shown in Figure 2, the cylindrical member 19 of one of the rings being provided with radial inwardly projecting ears as at 20 upon the outer edge portion thereof adapted to lie flatly against one side of the felly 16. A securing ring 21 of angular cross section is adapted to be disposed so that one flange thereof overlaps the member 19 of the ring which is provided with no ears and this securing ring 21 has its other flange disposed against the other side of the felly 18 and formed with openings aligned with the openings of the ears 20 for reception of a plurality of bolts 22 that are also passed through the felly 16. Nuts 23 are threaded upon the bolts 22 to retain them in place and hold the securing ring 21 tightly against the adjacent side of the felly 16 whereby the ring members carried by the tire shoe are held in adjacent relation upon the periphery of the felly as shown in Figure 2. It is contemplated to construct the strip 10 of normally expanded form so that the rings carried by the tire shoe and embodying the members 17 and 19 will be separated and thereby slid off of the felly in opposite directions or toward opposite sides upon removal of the bolts 23 thereby facilitating removal of the tire from the wheel. The several parts will, of course, be properly formed, so as to permit the passage of the valve stem 8 therethrough in the usual manner. If found necessary or desirable, the members 17 and 19 of each of the fastening rings may be connected by reinforcing webs indicated at 24.

A tire constructed in accordance with the above will be extremely light in weight and simple and durable in construction, as well as effective in operation for the intended purposes and advantages. Further, the tire may be applied or removed with facility and ease.

Having thus described my invention, what I claim as new and desire to secure by Letters Patent is:

1. A shoe adapted for reception of a pneumatic tube and circumferentially split at its inner side, said shoe having the external metallic armor embodying an annular series of overlapping transversely disposed circular plates of resilient form, a series of transverse anti-skidding lug plates rigid with the tread portions of said armor strip, the lugs of each armor strip having overhanging lips overlapping the adjacent edges of the next adjacent armor strip for resisting relative displacement of the armor strips at their tread portions and circumferentially of the shoe, said shoe further embodying a lamination inwardly about which the ends of said armor strips are passed and secured for forming a binding reinforcement for the edge of said lamination.

2. A shoe adapted for reception of a pneumatic tube and circumferentially split at its inner side, said shoe having the external metallic armor embodying an annular series of overlapping transversely disposed circular plates of resilient form, a series of transverse anti-skidding lug plates rigid with the tread portions of said armor strip, the lugs of each armor strip having overhanging lips overlapping the adjacent edges of the next adjacent armor strip for resisting relative displacement of the armor strips at their tread portions and circumferentially of the shoe said shoe further embodying a lamination inwardly about which the ends of said armor strips are passed and secured for forming a binding reinforcement for the edge of said lamination, and means for detachably mounting the tire shoe upon the felly of a vehicle wheel, said last named means embodying a fastening ring along each edge of the shoe and including inner and outer circular members respectively of arcuate and flat cross section and rigidly connected, the arcuate members of said rings being rigidly attached to the inner end portions of said armor strips.

3. A shoe adapted for reception of a pneumatic tube and circumferentially split at its inner side, said shoe having an external metallic armor embodying an annular series of overlapping transversely disposed circular plates of resilient form, a series of transverse anti-skidding lug plates rigid with the tread portion of said armor strip, the lugs of each armor strip having overhanging lips overlapping the adjacent edges of the next adjacent armor strip for resisting relative displacement of the armor strips at their tread portions and circumferentially of the shoe, said shoe further embodying an inner lamination of relatively great thickness and composed of canvas and an outer layer of relatively thin rubber upon which the armor is secured.

In testimony whereof I affix my signature.

GENNARO PAGELLA.